United States Patent [19]
Okamoto et al.

[11] 3,891,626
[45] June 24, 1975

[54] 1-SUBSTITUTED BENZO(B) AZOCINE DERIVATIVES AND THEIR ACID ADDITION SALTS

[75] Inventors: Tadashi Okamoto, Ashiya; Tsuyoshi Kobayashi, Minoo; Hisao Yamamoto, Nishinomiya, all of Japan

[73] Assignee: Sumitomo Chemical Co., Ltd., Japan

[22] Filed: Nov. 1, 1973

[21] Appl. No.: 411,922

Related U.S. Application Data

[62] Division of Ser. No. 80,801, Oct. 14, 1970, abandoned.

[30] Foreign Application Priority Data

| Apr. 30, 1970 | Japan | 45-37361 |
| Apr. 30, 1970 | Japan | 45-37362 |
| May 18, 1970 | Japan | 45-42636 |
| May 27, 1970 | Japan | 45-45920 |

[52] U.S. Cl....260/239 BB; 260/239.33; 260/247.1 E; 260/247.2 A; 260/247.2 R; 260/247.5 H; 260/293.59; 260/313.1; 260/326 N; 424/244; 424/284; 424/267

[51] Int. Cl.. C07d 41/00; C07d 57/00; C07d 87/83

[58] Field of Search.. 260/239 BB, 247.2 R, 293.59, 260/247.5 H

[56] References Cited
UNITED STATES PATENTS
3,714,148 1/1973 Okamoto et al............... 260/239 D OTHER PUBLICATIONS
Chemical Abst. Vol. 71; P3120r, 1969.

Primary Examiner—Lorraine A. Weinberger
Assistant Examiner—Paul J. Killos
Attorney, Agent, or Firm—Craig & Antonelli

[57] ABSTRACT

A 1-substituted benzo[b]azocine derivatives of the formula:

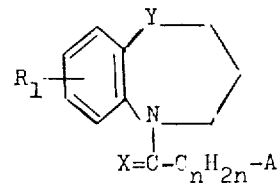

wherein $R_1$ is a hydrogen atom or a halogen atom, X is an oxygen atom or two hydrogen atoms, Y is a vinylene group or an ethylene group, A is a piperidino group, a morpholino group or a group of the formula:

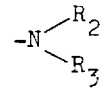

(wherein $R_2$ is a hydrogen atom or a lower alkyl group and $R_3$ is a hydrogen atom, a lower alkyl group, a formyl group or a lower alkanoyl group and $n$ is an integer of 1 to 3, and its acid addition salts, which are useful as anorectics, antidepressants and tranquilizers and can be prepared from the corresponding 1-unsubstituted benzo[b]azocine-2,6-dione derivative through three to five stages, i.e., reduction, dehydration and aminoalkanoylation as the essential stages with reduction and hydrogenation as the optional stages.

18 Claims, No Drawings

1-SUBSTITUTED BENZO(B) AZOCINE DERIVATIVES AND THEIR ACID ADDITION SALTS

This is a division of application Ser. No. 80,801 filed Oct. 14, 1970, now abandoned.

The present invention relates to a novel process for production of 1-substituted benzo[b]azocine derivatives and their acid addition salts, and products thereby.

The term "lower" used in connection with some atomic groups in this specification is intended to mean the one having one to five carbon atoms.

The said 1-substituted benzo[b]azocine derivatives are representable by the formula:

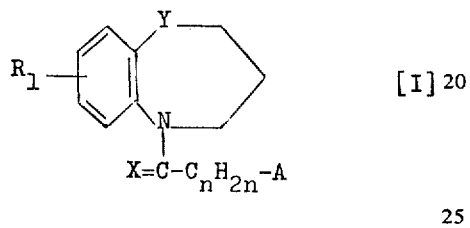

[I]

wherein $R_1$ is a hydrogen atom or a halogen atom (e.g. chlorine, bromine, iodine, fluorine), X is an oxygen atom or two hydrogen atoms, Y is a vinylene group or an ethylene group, A is a piperidino group, a morpholino group or a group of formula:

[wherein $R_2$ is a hydrogen atom or a lower alkyl group (e.g. methyl, ethyl, propyl, isopropyl, butyl) and $R_3$ is a hydrogen atom, a lower alkyl group (e.g. methyl, ethyl, propyl, isopropyl, butyl), a formyl group or a lower alkanoyl group (e.g. acetyl, propionyl, butyryl)] and $n$ is an integer of 1 to 3.

Their acid addition salts include inorganic acid addition salts such as hydrohalides (e.g. hydrochloride, hydrobromide), sulfate, nitrate and phosphate and organic acid addition salts such as oxalate, maleate, tartrate, citrate, acetate and succinate.

The 1-substituted benzo[b]azocine derivatives [I] and their non-toxic acid addition salts affect on the central nervous system and are useful as medicaments such as anorectics, antidepressants and tranquilizers. They may be administered orally by incorporating a therapeutic dosage of at least one of them in conventional dosage forms such as tablets, capsules, suspensions and the like.

A basic object of the present invention is to provide a novel and advantageous process for producing 1-substituted benzo[b]azocine derivatives [I] and their acid addition salts. Another object of this invention is to provide novel 1-substituted benzo[b]azocine derivatives [I] and their acid addition salts. A further object of the invention is to provide the pharmaceutical use of the 1-substituted benzo[b]azocine derivatives [I] and their non-toxic acid addition salts. These and other objects of the invention will be apparent to those skilled in the art from the following descriptions.

The 1-substituted benzo[b]azocine derivatives [I] include the following three kinds of compounds:

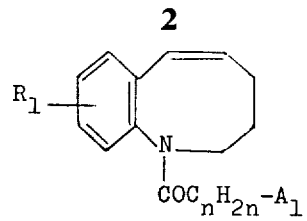

[Ia]

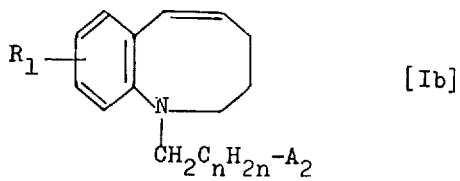

[Ib]

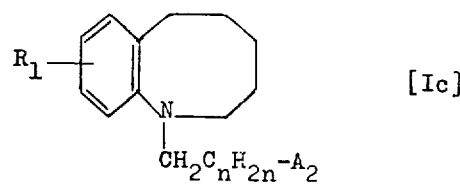

[Ic]

wherein $A_1$ is a piperidino group, a morpholino group or a group of the formula:

(wherein $R_2$ and $R_3$ are each as defined above), $A_2$ is a piperidino group, a morpholino group or a group of the formula:

[wherein $R_2$ is as defined above and $R_4$ is a hydrogen atom or a lower alkyl group (e.g. methyl, ethyl, propyl, isopropyl, butyl)], and $R_1$ and n are each as defined above.

According to the present invention, the 1-substituted benzo[b]azocine derivatives [I] can be prepared from the corresponding 1-unsubstituted benzo[b]azocine-2,6-dione derivatives through three to five stages as shown in the following scheme:

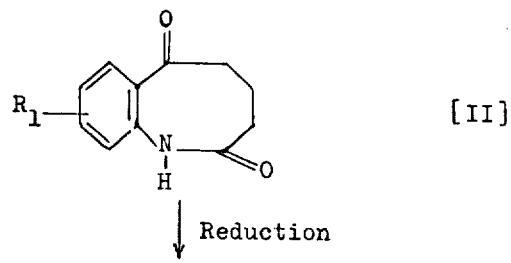

[II]

↓ Reduction

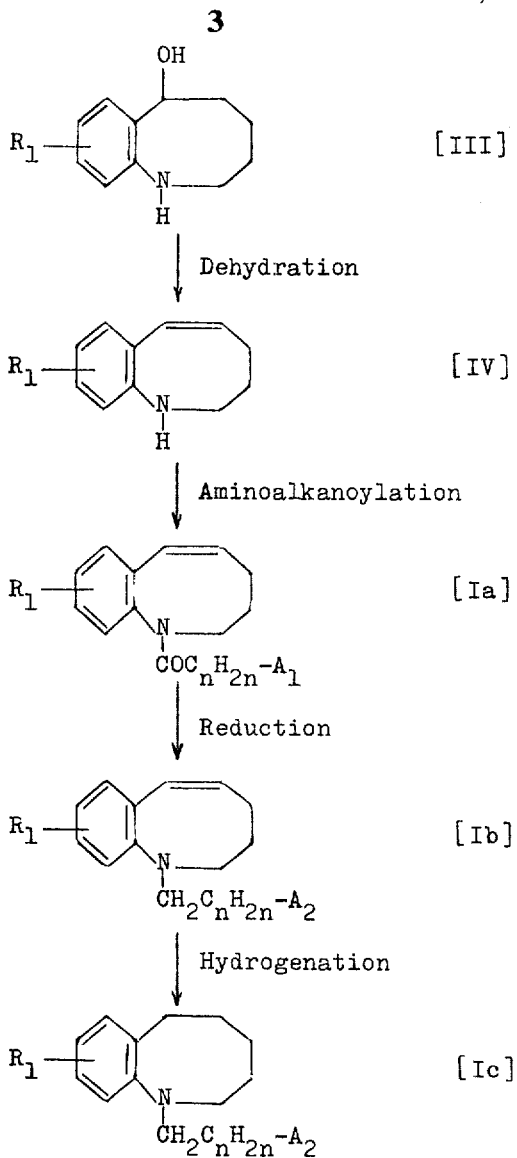

wherein $R_1$, $A_1$, $A_2$ and n are each as defined above.

The starting 1-unsubstituted benzo[b]azocine-2,6-dione derivatives [II] are known or can be prepared, for instance, by reacting an $R_1$ phenylhydrazine with cyclopentanone in the presence of a condensing agent (e.g. hydrochloric acid, sulfuric acid, phosphoric acid) and reacting the resultant cyclopent[b]indole derivative with an oxidizing agent (e.g. ozone, sodium metaperiodate) as shown in the following scheme:

wherein $R_1$ is as defined above.

The first stage is concerned with the reduction of the 1-unsubstituted benzo[b]azocine-2,6-dione derivative [II]. Thus, the 1-unsubstituted benzo[b]azocine-2,6-dione derivative [II] is treated with a reducing agent such as a metal hydride (e.g. lithium aluminum hydride, lithium aluminum hydride-aluminum chloride, diisobutyl aluminum hydride) to give the 1-unsubstituted 6-hydroxybenzo[b]azocine derivative [III]. The treatment is preferably carried out in an inert solvent (e.g. ether, tetrahydrofuran, dioxane, N-ethylmorpholine). The reaction proceeds at room temperature and, if desired, may be effected while heating or cooling.

Examples of the thus prepared 1-unsubstituted 6-hydroxybenzo[b]azocine derivative. [III] are as follows: 6-hydroxy-1,2,3,4,5,6-hexahydro-1-benzo[b]azocine; 6-hydroxy-8Chloro-1,2,3,4,5,6-hexahydro-1-benzo[b]azocine; 6-hydroxy-8-fluoro-1,2,3,4,5,6-hexahydro-1-benzo[b]azocine; 6-hydroxy-9-chloro-1,2,3,4,5,6-hexahydro-1-benzo[b]azocine; 6-hydroxy-9-fluoro-1,2,3,4,5,6-hexahydro-1-benzo[b]azocine, etc.

The second stage is concerned with the dehydration of the 1-unsubstituted 6-hydroxybenzo[b]azocine derivative [III]. Thus, the 1-unsubstituted 6-hydroxybenzo[b]azocine derivative [III] is treated with a dehydrating agent (e.g. p-toluenesulfonic acid, hydrochloric acid, sulfuric acid, phosphoric acid, phosphorus pentoxide, phosphorus oxychloride, phosphorus pentabromide, phosphorus pentachloride) to give the 1-unsubstituted tetrahydrobenzo[b]azocine derivative [IV]. The treatment is usually carried out in an inert solvent (e.g. benzene, toluene, xylene, chloroform) while refluxing.

Examples of the thus prepared 1-unsubstituted tetrahydrobenzo[b]azocine derivative [IV] are as follows: 1,2,3,4-tetrahydro-1-benzo[b]azocine; 8-chloro-1,2,3,4-tetrahydro-1-benzo[b]azocine; 8-fluoro-1,2,3,4-tetrahydro-1-benzo[b]azocine; 9-chloro-1,2,3,4-tetrahydro-1-benzo[b]azocine; 9-fluoro-1,2,3,4-tetrahydro-1-benzo[b]azocine, etc.

The third stage is concerned with the aminoalkanoylation of the 1-unsubstituted tetrahydrobenzo[b]azocine derivative [IV]. The aminoalkanoylation can be accomplished by various procedures, some of which are shown in the following scheme:

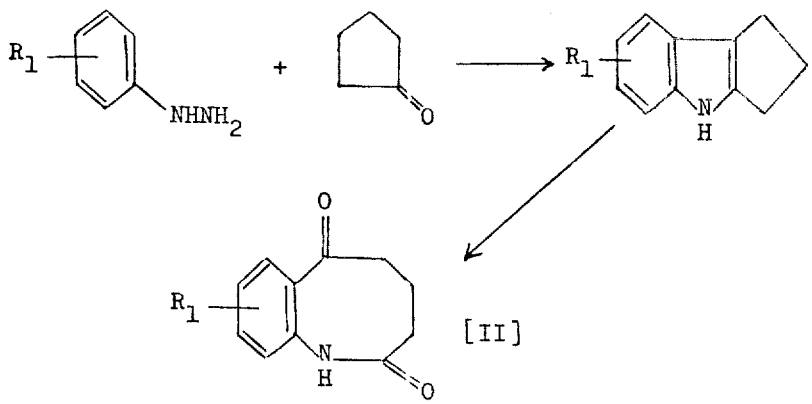

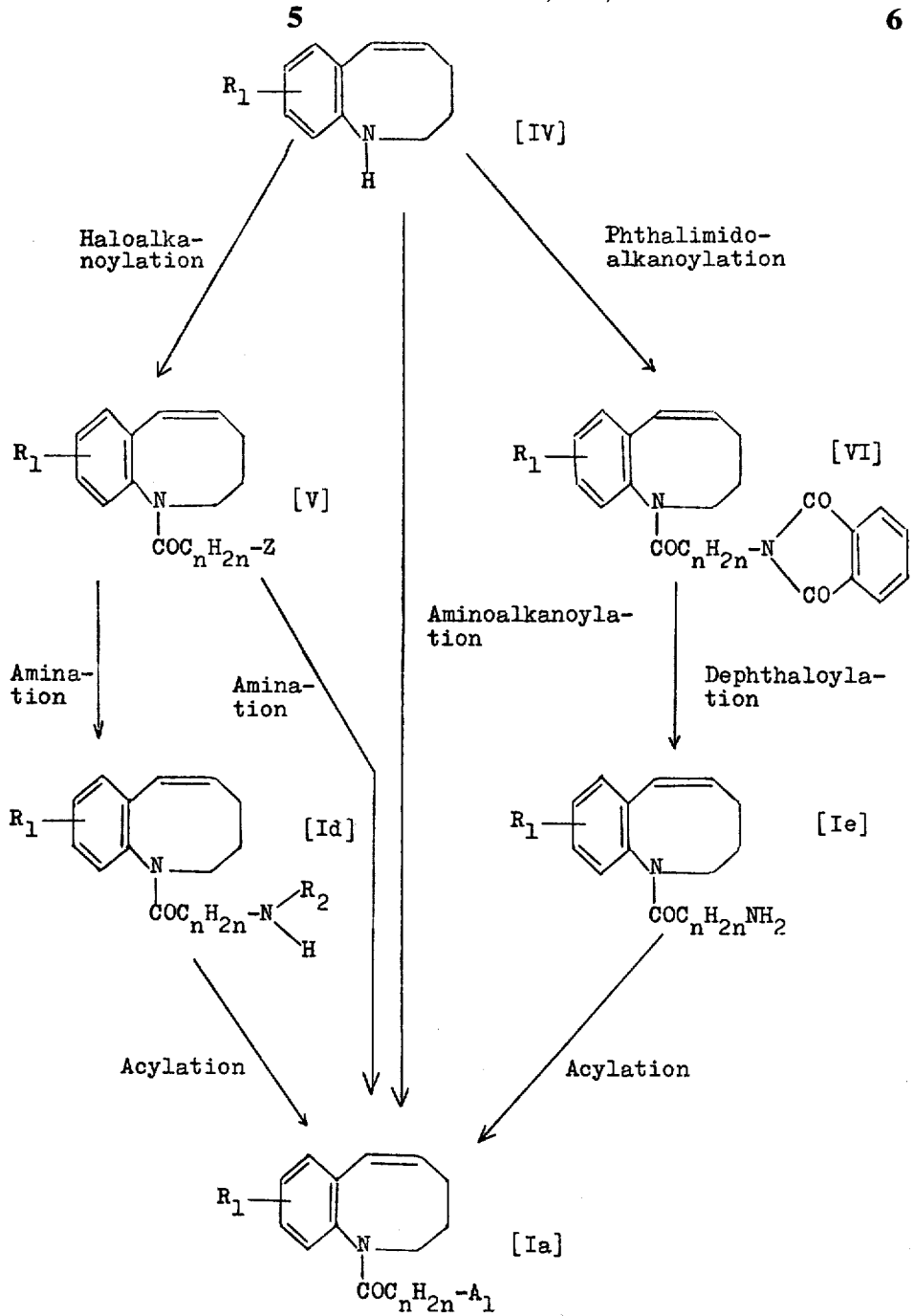

wherein Z is a halogen atom (e.g. chlorine, bromine), and $R_1$, $R_2$, $A_1$ and $n$ are each as defined above.

In one of the procedures, the 1-unsubstituted tetrahydrobenzo[b]azocine derivative [IV] is subjected to one-step aminoalkanoylation to give the 1-aminoalkanoyltetrahydrobenzo[b]azocine derivative [Ia]. The one-step aminoalkanoylation is carried out by treating the 1-unsubstituted tetrahydrobenzo[b]azocine derivative [IV] or its alkali metal salt (e.g. sodium salt, potassium salt) with an aminoalkanoic acid of the formula: $A_1$—$C_nH_{2n}COOH$ wherein $A_1$ and $n$ are each as defined above or its functional derivative such as acid halide (e.g. acid chloride, acid bromide), acid anhydride, mixed acid anhydride or p-nitrophenyl ester. The treatment is preferably effected in the presence of a condensing agent (e.g. pyridine, triethylamine, sodium carbonate, potassium carbonate, sodium hydroxide, potassium hydroxide, dicyclohexylcarbodiimide) in an inert solvent (e.g. ether, tetrahydrofuran, dioxane, benzene, toluene, pyridine, chloroform, dimethylformamide). The reaction proceeds at room temperature and, if desired, may be executed while heating or cooling.

The said alkali metal salt of the 1-unsubstituted tetrahydrobenzo[b]azocine derivative [IV] may be prepared, for instance, by treating the free amine with sodium hydride, potassium hydride, sodium amide, potassium amide or the like. The mixed acid anhydride of the aminoalkanoic acid may be prepared, for example, by treating the free acid with ethyl chloroformate, isobutyl chloroformate or the like.

In another procedure, the 1-unsubstituted tetrahydrobenzo[b]azocine derivative [IV] is subjected to haloalkanoylation and then amination to give the 1- aminoalkanoyltetrahydrobenzo[b]azocine derivative [Ia]. The haloalkanoylation is carried out by treating the 1-unsubstituted tetrahydrobenzo[b]azocine derivative [IV] or its alkali metal salt with a haloalkanoic acid of the formula: $Z-C_nH_{2n}COOH$ wherein Z and n are each as defined above or its functional derivative such as acid halide (e.g. acid chloride, acid bromide), acid anhydride, mixed acid anhydride or p-nitrophenyl ester. The treatment is preferably effected in the presence of a condensing agent (e.g. pyridine, triethylamine, sodium carbonate, potassium carbonate, sodium hydroxide, potassium hydroxide, dicyclohexylcarbodiimide) in an inert solvent (e.g. ether, tetrahydrofuran, dioxane, benzene, toluene, pyridine, chloroform, dimethylformamide). The reaction proceeds at room temperature and, if desired, may be executed while heating or cooling. The preparation of the alkali metal salt of the 1-unsubstituted tetrahydrobenzo[b]azocine derivative [IV] and the mixed acid anhydride of the haloalkanoic acid may be attained as illustrated above.

The product in the above haloalkanoylation is the 1-haloalkanoyltetrahydrobenzo[b]azocine derivative [V], of which examples are as follows: 1-chloroacetyl-1,2,3,4-tetrahydro-1-benzo[b]azocine; 1-($\beta$-bromopropionyl)-1,2,3,4-tetrahydro-1-benzo[b]azocine; 1-bromoacetyl-1,2,3,4-tetrahydro-1-benzo[b]azocine; 1-($\gamma$-bromobutyryl)-8-chloro-1,2,3,4-tetrahydro-1-benzo[b]azocine; 1-($\beta$-bromobutyryl)-1,2,3,4-tetrahydro-1-benzo[b]azocine; 1-($\alpha$-chloropropionyl)-8-chloro-1,2, 3,4-tetrahydro-1-benzo[b]azocine; 1-($\beta$-bromopropionyl)-9-chloro-1,2,3,4-tetrahydro-1-benzo[b]azocine; 1-chloroacetyl-9-fluoro-1,2,3,4-tetrahydro-1-benzo[b]azocine; 1-($\alpha$-bromopropionyl)-9-chloro-1,2,3,4-tetrahydro-1-benzo[b]azocine; 1-($\beta$-bromopropionyl)-8-chloro-1,2,3,4-tetrahydro-1-benzo[b]azocine; 1-($\beta$bromopropionyl)-8-fluoro-1,2,3,4-tetrahydro-1-benzo[b]azocine, etc.

The subsequent amination is carried out by treating the 1-haloalkanoyltetrahydrobenzo[b]azocine derivative [V] with an amine of the formula: $H-A_1$ wherein $A_1$ is as defined above. The treatment is conducted in the presence or absence of a condensing agent (e.g. [pyridine, triethylamine, sodium hydroxide, potassium hydroxide, sodium carbonate, potassium carbonate, sodium hydride, sodium amide, and dicyclohexylcarbodiimide], if necessary, in an inert solvent (e.g. ether, tetrahydrofuran, dioxane, benzene, toluene, pyridine, chloroform, dimethylformamide). Temperature and pressure are not critical, and the reaction may be effected at room temperature and atmospheric pressure, or at elevated temperatures and elevated pressures.

In another procedure particularly applicable for the production of the 1-aminoalkanoyltetrahydrobenzo-[b]azocine derivative [Ia:

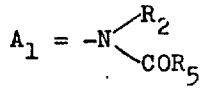

wherein $R_5$ is a hydrogen atom or a lower alkyl group (e.g. methyl, ethyl, propyl, isopropyl) and $R_2$ is as defined above], the 1-haloalkanoyltetrahydrobenzo[b]azocine derivative [V] is subjected to amination and then acylation. The amination is carried out by treating the 1-haloalkanoyltetrahydrobenzo[b]azocine derivative [V] with an amine of the formula: $H_2N-R_2$ wherein $R_2$ is as defined above. The treatment may be effected in the essentially same manner as in the said amination.

The product in the above amination is the 1-aminoalkanoyltetrahydrobenzo[b]azocine derivative [Id], of which examples are as follows: 1-methylaminoacetyl-1,2,3,4-tetrahydro-1-benzo[b]azocine; 1-ethylaminoacetyl-1,2,3,4-tetrahydro-1-benzo[b]azocine; 1-($\beta$-methylaminopropionyl)-1,2,3,4-tetrahydro-1-benzo[b]azocine; 1-ethylaminoacetyl-1,2,3,4-tetrahydro-1-benzo[b]azocine; 1-($\gamma$-methylaminobutyryl)-8-chloro-1,2,3,4-tetrahydro-1-azocine; 1-($\beta$-methylaminobutyryl)-1,2,3,4-tetrahydro-1-benzo[b]azocine; 1-($\alpha$-ethylaminopropionyl)-8-chloro-1,2,3,4-tetrahydro-1-benzo[b]azocine; 1-($\beta$-methylaminopropionyl)-9-chloro-1,2,3,4-tetrahydro-1-benzo[b]azocine; 1-propionylaminoacetyl-9-fluoro-1,2,3,4-tetrahydro-1-benzo[b]azocine; 1-($\alpha$-methylaminopropionyl)-9-chloro-1,2,3,4-tetrahydro-1-benzo[b]azocine; 1-($\beta$-ethylaminopropionyl)-8-chloro-1,2,3,4-tetrahydro-1-benzo[b]azocine, etc. The subsequent acylation is carried out by treating the 1-aminoalkanoyltetrahydrobenzo[b]azocine derivative [Id] with an alkanoic acid of the formula: $R_5-COOH$ wherein $R_5$ is as defined above or its functional derivative such as acid halide (e.g. acid chloride, acid bromide), acid anhydride, mixed acid anhydride or p-nitrophenyl ester. The treatment is usually effected in the presence or absence of a condensing agent (e.g. pyridine, triethylamine, sodium carbonate, potassium carbonate, sodium hydroxide, potassium hydroxide, sodium hydride, sodium amide, sodium ethoxide, dicyclohexylcarbodiimide) in an inert solvent (e.g. ether, tetrahydrofuran, dioxane, benzene, toluene, pyridine, chloroform, dimethylformamide). The reaction proceeds at room temperature and, if desired, may be executed while heating or cooling.

In a further procedure which is also particularly applicable to the production of the 1-aminoalkanoyltetrahydrobenzo[b]azocine derivative [Ia:

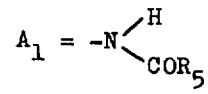

wherein $R_5$ is as defined above], the 1-unsubstituted tetrahydrobenzo[b]azocine derivative [IV] is subjected to phthalimidoalkanoylation, dephthaloylation and then acylation. The phthalimidoalkanoylation is carried out by treating the 1-unsubstituted tetrahydrobenzo[b]azocine derivative [IV] or its alkali metal salt (e.g. sodium salt, potassium salt) with a phthalimidoalkanoic acid of the formula:

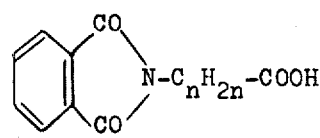

wherein $n$ is as defined above or its functional derivative such as acid halide (e.g. acid chloride, acid bromide), acid anhydride, mixed acid anhydride or p-nitrophenyl ester. The treatment is usually effected in the presence or absence of a condensing agent (e.g. pyridine, triethylamine, sodium carbonate, potassium carbonate, sodium hydroxide, potassium hydroxide, sodium hydride, sodium amide, sodium ethoxide, dicyclohexylcarbodiimide) in an inert solvent (e.g. ether, tetrahydrofuran, dioxane, benzene, toluene, pyridine, chloroform, dimethylformamide). The reaction proceeds at room temperature and, if desired, may be executed while heating or cooling.

The product in the above phthalimidoalkanoylation is the 1-phthalimidoalkanoyltetrahydrobenzo[b]azocine derivative [VI], of which examples are as follows: 1-phthalimidoacetyl-1,2,3,4-tetrahydro-1-benzo[b]azocine; 1-phthalimidoacetyl-8-chloro-1,2,3,4-tetrahydro-1-benzo[b]azocine; 1-(α-phthalimidopropionyl)-8-chloro-1,2,3,4-tetrahydro-1-benzo[b]azocine; 1-(β-phthalimidopropionyl)-8-chloro-1,2,3,4-tetrahydro-1-benzo[b]-azocine; 1-(γ-phthalimidobutyryl)-8-chloro-1,2,3,4-tetrahydro-1-benzo[b]azocine; 1-phthalimidoacetyl-9-chloro-1,2,3,4-tetrahydro-1-benzo[b]azocine; 1-(α-phthalimidopropionyl)-9-chloro-1,2,3,4-tetrahydro-1-benzo[b]azocine; 1-(β-phthalimidopropionyl)-9-chloro-1,2,3,4-tetrahydro-1-benzo[b]azocine; 1-phthalimidoacetyl-8-fluoro-1,2,3,4-tetrahydro-1-benzo[b]azocine; 1-phthalimidoacetyl-9-fluoro-1,2,3,4-tetrahydro-1-benzo[b]azocine; 1-(α-phthalimidopropionyl)-9-fluoro-1,2,3,4-tetrahydro-1-benzo[b]azocine; 1-(β-phthalimidopropionyl)-9-fluoro-1,2,3,4-tetrahydro-1-benzo[b]azocine; 1-(α-phthalimidopropionyl)-1,2,3,4-tetrahydro-1-benzo[b]azocine; 1-(β-phthalimidopropionyl)-1,2,3,4-tetrahydro-1-benzo[b]azocine; 1-(β-phthalimidobutyryl)-8-chloro-1,2,3,4-tetrahydro-1-benzo[b]azocine, etc.

The subsequent dephthaloylation is carried out by treating the phthalimidoalkanoyltetrahydrobenzo[b]azocine derivative [VI] with hydrazine. The treatment is effected in the presence or absence of an inert solvent (e.g. water, methanol, ethanol, isopropanol, benzene, toluene, xylene, ether, tetrahydrofuran, dioxane, chloroform). The reaction proceeds at room temperature and, if desired, may be conducted while heating so as to accelerate the proceeding of the reaction.

The product in the above dephthaloylation is the 1-aminoalkanoyltetrahydrobenzo[b]azocine derivative [Ie], of which examples are as follows: 1-aminoacetyl-1,2,3,4-tetrahydro-1-benzo[b]azocine; 1-aminoacetyl-8-chloro-1,2,3,4-tetrahydro-1-benzo[b]azocine; 1-(α-aminopropionyl)-8-chloro-1,2,3,4-tetrahydro-1-benzo[b]azocine; 1-(β-aminopropionyl)-8-chloro-1,2,3,4-tetrahydro-1-benzo[b]azocine; 1-(γ-aminobutyryl)-8-chloro-1,2,3,4-tetrahydro-1-benzo[b]azocine; 1-aminoacetyl-9-chloro-1,2,3,4-tetrahydro-1-benzo[b]azocine; 1-(α-aminopropionyl)-9-chloro-1,2,3,4-tetrahydro-1-benzo[b]azocine; 1-(β-aminopropionyl)-9-chloro-1,2,3,4-tetrahydro-1-benzo[b]azocine; 1-aminoacetyl-9-fluoro-1,2,3,4-tetrahydro-1-benzo[b]azocine; 1-(α-aminopropionyl)-9-fluoro-1,2,3,4-tetrahydro-1-benzo[b]-azocine; 1-(β-aminopropionyl)-9-fluoro-1,2,3,4-tetrahydro-1-benzo[b azocine; 1-(α-aminopropionyl)-1,2,3,4-tetrahydro-1-benzo[b]azocine; 1-(β-aminopropionyl)-1,2,3,4-tetrahydro-1-benzo[b]azocine; 1-(β-aminobutyryl)-8-chloro-1,2,3,4-tetrahydro-1-benzo[b]azocine, etc.

The following acylation is carried out by treating the 1-aminoalkanoyltetrahydrobenzo[b]azocine derivative [Ie] with an alkanoic acid of the formula: $R_5$—COOH wherein $R_5$ is as defined above or its functional derivative such as acid halide (e.g. acid chloride, acid bromide), acid anhydride, mixed acid anhydride or p-nitrophenyl ester. The treatment may be effected in the substantially same manner as in the said acylation.

Examples of the 1-aminoalkanoyltetrahydrobenzo[b]-azocine derivatives [Ia] prepared by various procedures as above are as follows: 1-aminoacetyl-1,2,3,4-tetrahydro-1-benzo[b]azocine; 1-aminoacetyl-8-chloro-1,2,3,4-tetrahydro-1-benzo[b]azocine; 1-aminoacetyl-8-fluoro-1,2,3,4-tetrahydro-1-benzo[b]azocine; 1-aminoacetyl-9-chloro-1,2,3,4-tetrahydro-1-benzo[b]azocine; 1-aminoacetyl-9-fluoro-1,2,3,4-tetrahydro-1-benzo[b]azocine; 1-methylaminoacetyl-1,2,3,4-tetrhaydro-1-benzo[b]azocine; 1-methylaminoacetyl-8-chloro-1,2,3,4-tetrahydro-1-benzo[b]azocine; 1-methylaminoacetyl-8-fluoro-1,2,3,4-tetrahydro-1-benzo[b]azocine; 1-methylaminoacetyl-9-chloro-1,2,3,4-tetrahydro-1-benzo[b]azocine; 1-methylaminoacetyl-9-fluoro-1,2,3,4-tetrahydro-1-benzo[b]azocine; 1-ethylaminoacetyl-8-chloro-1,2,3,4-tetrahydro-1-benzo[b]azocine; 1-ethylaminoacetyl-1,2,3,4-tetrahydro-1-benzo[b]azocine; 1-propylaminoacetyl-8-chloro-1,2,3,4-tetrahydro-1-benzo[b]azocine; 1-dimethylaminoacetyl-1,2,3,4-tetrahydro-1-benzo[b]azocine; 1-dimethylaminoacetyl-8-chloro-1,2,3,4-tetrahydro-1-benzo[b]azocine; 1-dimethylaminoacetyl-8-fluoro-1,2,3,4-tetrahydro-1-benzo[b]azocine; 1-dimethylaminoacetyl-9-chloro-1,2,3,4-tetrahydro-1-benzo[b]azocine; 1-dimethylaminoacetyl-9-fluoro-1,2,3,4-tetrahydro-1-benzo[b]azocine; 1-diethylaminoacetyl-8-chloro-1,2,3,4-tetrahydro-1-benzo[b]azocine; 1-N-methyl-N-ethylaminoacetyl-1,2,3,4-tetrahydro-1-benzo[b]azocine; 1-N-methyl-N-ethylaminoacetyl-8-chloro-1,2,3,4-tetrahydro-1-benzo[b]azocine; 1-formylaminoacetyl-1,2,3,4-tetrahydro-1-benzo[b]azocine; 1-formylaminoacetyl-8-chloro-1,2,3,4-tetrahydro-1-benzo[b]azocine; 1-formylaminoacetyl-8-fluoro-1,2,3,4-tetrahydro-1-benzo[b]azocine; 1-ethoxycarbonylaminoacetyl-1,2,3,4-tetrahydro-1-benzo[b]azocine; 1-ethoxycarbonylaminoacetyl-8-chloro-1,2,3,4-tetrahydro-1-benzo[b]azocine; 1-ethoxycarbonylaminoacetyl-8-fluoro-1,2,3,4-tetrahydro-1-benzo[b]azocine; 1-piperidinoacetyl-1,2,3,4-tetrahydro-1-benzo[b]azocine; 1-piperidinoacetyl-8-chloro-1,2,3,4-tetrahydro-1-benzo[b]azocine; 1-piperidinoacetyl-8-fluoro-1,2,3,4-tetrahydro-1-benzo[b]azocine; 1-formylaminoacetyl-9-chloro-1,2,3,4-tetrahydro-1-benzo[b]azocine; 1-ethoxycarbonylaminoacetyl-9-chloro-1,2,3,4-tetrahydro-1-benzo[b]azocine; 1-piperidinoacetyl-9-chloro-1,2,3,4-tetrahydro-1-benzo[b]azocine; 1-morpholinoacetyl-1,2,3,4-tetrahydro-1-benzo[b]azocine; 1-morpholinoacetyl-8-chloro-1,2,3,4-tetrahydro-1-benzo[b]azocine; 1-(β-aminopropionyl)-1,2,3,4-tetrahydro-1-benzo[b]azocine; 1-(β-aminopropionyl)-8-chloro-1,2,3,4-tetrahydro-1-benzo[b]azocine; 1-(β-aminopropionyl)-9-chloro-1,2,3,4-tetrahydro-1-benzo[b]azocine; 1-(β-aminopropionyl)-b 8-fluoro-1,2,3,4-tetrahydro-1-benzo[b]azocine; 1-(β-methylaminopropionyl)-8-chloro-1,2,3,4-tetrahydro-1-benzo[b]azocine; 1-(β-methylaminopropionyl)-8-chloro-1,2,3,4-tetrahydro-1-benzo[b]azocine; 1-(β-methylaminopropionyl)-8-fluoro-1,2,3,4-tetrahydro-1-benzo[b]azocine; 1-(β-ethylaminopropinyl)-1,2,3,4- tetrahydro-1-benzo[b]azocine; 1-(β-ethylaminopropionyl)-8-chloro-1,2,3,4-tetrahydro-1-benzo[b]azocine; 1-(β-dimethylaminopropionyl)-1,2,3,4-tetrahydro-1-benzo[b]azocine; 1-(β-dimethylaminopropionyl)-8-chloro-1,2,3,4-tetrahydro-1-benzo[b]azocine; 1-(β-dimethylaminopropionyl)-8-fluoro-1,2,3,4-tetrahydro-1-benzo[b]azocine; 1-(β-dimethylaminopropionyl)-9-chloro-1,2,3,4-tetrahydro-1-benzo[b]azocine; 1-(β-N-methyl-N-ethylaminopropionyl)-8-chloro-1,2,3,4-tetrahydro-1-benzo[b]azocine; 1-(β-formylaminopropionyl)-1,2,3,4-tetrahydro-1-benzo[b]azocine; 1-(β-formylaminopropionyl)-8-chloro-1,2,3,4-tetrahydro-1-benzo[b]azocine; 1-(β-formylaminopropionyl)-9-chloro-1,2,3,4-tetrahydro-1-benzo[b]azocine; 1-(β-ethoxycarbonylaminopropionyl)-1,2,3,4-tetrahydro-1-benzo[b]azocine; 1-(β-ethoxycarbonylaminopropionyl)-8-chloro-1,2,3,4-tetrahydro-1-benzo[b]azocine; 1-(β-ethoxycarbonylaminopropionyl)-9-chloro-1,2,3,4-tetrahydro-1-benzo[b]azocine; 1-(β-piperidinopropionyl)-1,2,3,4-tetrahydro-1-benzo[b]azocine; 1-(β-piperidinopropionyl)-8-chloro-1,2,3,4-tetrahydro-1-benzo[b]azocine; 1-(β-piperidinopropionyl)-8-fluoro-1,2,3,4-tetrahydro-1-benzo[b]azocine; 1-(β-piperidinopropionyl)-9-chloro-1,2,3,4-tetrahydro-1-benzo[b]azocine; 1-(β-morpholinopropionyl)-1,2,3,4-tetrahydro-1-benzo[b]azocine; 1-(β-morpholinopropionyl)-8-chloro-1,2,3,4-tetrahydro-1-benzo[b]azocine; 1-(β-morpholinopropionyl)-9-chloro-1,2,3,4-tetrahydro-1-benzo[b]azocine; 1-(α-aminopropionyl)-1,2,3,4-tetrahydro-1-benzo[b]azocine; 1-(α-aminopropionyl)-8-chloro-1,2,3,4-tetrahydro-1-benzo[b]azocine; 1-(α-aminopropionyl)-8-fluoro-1,2,3,4-tetrahydro-1-benzo[b]azocine; 1-(α-aminopropionyl)-9-chloro-1,2,3,4-tetrahydro-1-benzo[b]azocine; 1-(α-methylaminopropionyl)-1,2,3,4-tetrahydro-1-benzo[b]azocine; 1-(α-methylaminopropionyl)-8-chloro-1,2,3,4-tetrahydro-1-benzo[b]azocine; 1-(α-methylaminopropionyl)-9-chloro-1,2,3,4-tetrahydro-1-benzo[b]azocine; 1-(α-ethylaminopropionyl)-8-chloro-1,2,3,4-tetrahydro-1-benzo[b]azocine; 1-(α-ethylaminopropionyl)-9-chloro-1,2,3,4-tetrahydro-1-benzo[b]azocine; 1-(α-propylaminopropionyl)-8-chloro-1,2,3,4-tetrahydro-1-benzo[b]azocine; 1-(α-dimethylaminopropionyl)-1,2,3,4-tetrahydro-1-benzo[b]azocine; 1-(α-dimethylaminopropionyl)-8-chloro-1,2,3,4-tetrahydro-1-benzo[b]azocine; 1-(α-dimethylaminopropionyl)-8-fluoro-1,2,3,4-tetrahydro-1-benzo[b]azocine; 1-(α-dimethylaminopropionyl)-9-chloro-1,2,3,4-tetrahydro-1-benzo[b]azocine; 1-(α-diethylaminopropionyl)-8-chloro-1,2,3,4-tetrahydro-1-benzo[b]azocine; 1-(α-diethylaminopropionyl)-9-chloro-1,2,3,4-tetrahydro-1-benzo[b]azocine; 1-(α-N-methyl-N-ethylaminopropionyl)-1,2,3,4-tetrahydro-1-benzo[b]azocine; 1-(α-N-methyl-N-ethylaminopropionyl)-8-chloro-1,2,3,4-tetrahydro-1-benzo[b]azocine; 1-(α-formylaminopropionyl)-1,2,3,4-tetrahydro-1-benzo[b]azocine; 1-(α-formylaminopropionyl)-8-chloro-1,2,3,4-tetrahydro-1-benzo[b]azocine; 1-(α-formylaminopropionyl)-9-chloro-1,2,3,4-tetrahydro-1-benzo[b]azocine; 1-(α-ethoxycarbonylaminopropionyl)-1,2,3,4-tetrahydro-1-benzo[b]azocine; 1-(α-ethoxycarbonylaminopropionyl)-8-chloro-1,2,3,4-tetrahydro-1-benzo[b]azocine; 1-(α-ethoxycarbonylaminopropionyl)-9-chloro-1,2,3,4-tetrahydro-1-benzo[b]azocine; 1-(α-piperidinopropionyl)-1,2,3,4-tetrahydro-1-benzo[b]azocine 1-(α-piperidinopropionyl)-8-chloro-1,2,3,4-tetrahydro-1-benzo[b]azocine; 1-(α-piperidinopropionyl)-8-fluoro-1,2,3,4-tetrahydro-1-benzo[b]azocine; 1-(α-piperidinopropionyl)-9-chloro-1,2,3,4-tetrahydro-1-benzo[b]azocine; 1-(α-morpholinopropionyl)-1,2,3,4-tetrahydro-1-benzo[b]azocine; 1-(α-morpholinopropionyl)-8-chloro-1,2,3,4-tetrahydro-1-benzo[b]azocine; 1-(α-morpholinopropionyl)-9-chloro-1,2,3,4-tetrahydro-1-benzo[b]azocine; 1-(γ-aminobutyryl)-1,2,3,4-tetrahydro-1-benzo[b]azocine; 1-(β-aminobutyryl)-1,2,3,4-tetrahydro-1-benzo[b]azocine; 1-(β-aminobutyryl)-8-chloro-1,2,3,4-tetrahydro-1-benzo[b]azocine; 1-(β-dimethylaminobutyryl)-8-chloro-1,2,3,4-tetrahydro-1-benzo[b]azocine; 1-(β-dimethylaminobutyryl)-9-chloro-1,2,3,4-tetrahydro-1-benzo[b]azocine; 1-(γ-dimethylaminobutyryl)-8-chloro-1,2,3,4-tetrahydro-1-benzo[b]-azocine; 1-(β-methylaminobutyryl)-1,2,3,4-tetrahydro-1-benzo[b]azocine; 1-(β-piperidinobutyryl)-8-chloro-1,2,3,4-tetrahydro-1-benzo[b]azocine, etc.

The fourth stage is concerned with the reduction of the 1-aminoalkanoyltetrahydrobenzo[b]azocine derivative [Ia]. Thus, the 1m-aminoalkanoyltetrahydrobenzo[b]azocine derivative [Ia] is treated with a reducing agent to give the 1-aminoalkyltetrahydrobenzo[b]azocine derivative [Ib]. Examples of the reducing agent are an alkali metal (e.g. sodium, potassium) in an alkanol (e.g. methanol, ethanol), a metal hydride (e.g. lithium aluminum hydride, diisobutyl aluminum hydride, sodium borohydride, alkoxy lithium aluminum hydride), mixed metal hydrides (e.g. lithium aluminum hydride-aluminum chloride, sodium borohydride-cobaltous chloride), etc. Among them, the use of a metal hydride or a mixed metal hydride in an inert solvent (e.g. ether, tetrahydrofuran, dioxane, N-ethylmorpholine) is especially preferred. The reaction is usually conducted at room temperature and, if desired, may be executed while heating or cooling. In the course of the reaction, a formyl group is, if any, converted into methyl. Also, a lower alkanoyl group is, if any, changed to lower alkyl.

Examples of the thus prepared 1-aminoalkyltetrahydrobenzo[b]azocine derivative [Ib] are as follows: 1-(2-aminoethyl)-1,2,3,4-tetrahydro-1-benzo[b]azocine; 1-(2-aminoethyl)-8-chloro-1,2,3,4-tetrahydro-1-benzo[b]azocine; 1-(2-aminoethyl)-8-fluoro-1,2,3,4-tetrahydro-1-benzo[b]azocine; 1-(2-aminoethyl)-9-chloro-1,2,3,4-tetrahydro-1-benzo[b]azocine; 1-(2-methylaminoethyl)-1,2,3,4-tetrahydro-1-benzo[b]azocine; 1-(2-methylaminoethyl)-8-chloro-1,2,3,4-tetrahydro-1-benzo[b]azocine; 1-(2-methylaminoethyl)-9-chloro-1,2,3,4-tetrahydro-1-benzo[b]azocine; 1-(2-ethylaminoethyl)-1,2,3,4-tetrahydro-1-benzo[b]azocine; 1-(2-methylaminoethyl)-8-fluoro-1,2,3,4-tetrahydro-1-benzo[b]azocine; 1-(2-ethylaminoethyl)-8-chloro-1,2,3,4-tetrahydro-1-benzo[b]azocine; 1-(2-dimethylaminoethyl)-1,2,3,4-tetrahydro-1-benzo[b]azocine; 1-(2-dimethylaminoethyl)-8-chloro-1,2,3,4-tetrahydro-1-benzo[b]azocine; 1-(2-dimethylaminoethyl)-8-fluoro-1,2,3,4-tetrahydro-1-benzo[b]azocine; 1-(2-dimethylaminoethyl)-9-chloro- 1,2,3,4-tetrahydro-1-benzo[b]azocine; 1-(2-diethylaminoethyl)-1,2,3,4-tetrahydro-1-benzo[b]azocine; 1-(2-propylaminoethyl)-8-chloro-1,2,3,4-tetrahydro-1-benzo[b]azocine; 1-(2-diethylaminoethyl)-8-chloro-1,2,3,4-tetrahydro-1-benzo[b]azocine; 1-(2-diethylaminoethyl)-9-chloro-1,2,3,4-tetrahydro-1-benzo[b]azocine; 1-(2-N-methyl-N-ethylaminoethyl)-8-chloro-1,2,3,4-tetrahydro-1-benzo[b]azocine; 1-(2-piperidinoethyl)-1,2,3,4-tetrahydro-1-benzo[b]azocine; 1-(2-piperidinoethyl)-8-chloro-1,2,3,4-tetrahydro-1-benzo[b]azocine; 1-(2-piperidinoethyl)-8-fluoro-1,2,3,4-tetrahydro-1-benzo[b]azocine; 1-(2-piperidinoethyl)-9-chloro-1,2,3,4-tetrahydro-1-benzo[b]azocine; 1-(2-morpholinoethyl)-1,2,3,4-tetrahydro-1-benzo[b]azocine; 1-(2-morpholinoethyl)-8-chloro-1,2,3,4-tetrahydro-1-benzo[b]azocine; 1-(2-morpholinoethyl)-8-fluoro-1,2,3,4-tetrahydro-1-benzo[b]azocine; 1-(2-morpholinoethyl)-9-chloro-1,2,3,4-tetrahydro-1-benzo[b]azocine; 1-(3-aminopropyl)-1,2,3,4-tetrahydro-1-benzo[b]azocine; 1-(3-aminopropyl)-8-chloro-1,2,3,4-tetrahydro-1-benzo[b]azocine; 1-(3-aminopropyl)-8-fluoro-1,2,3,4-tetrahydro-1-benzo[b]azocine; 1-(3-aminopropyl)-8-fluoro-1,2,3,4-tetrahydro-1-benzo[b]azocine; 1-(3-aminopropyl)-9-chloro-1,2,3,4-tetrahydro-1-benzo[b]azocine; 1-(3-methylaminopropyl)-1,2,3,4-tetrahydro-1-benzo[b]azocine; 1-(3-methylaminopropyl)-8-chloro-1,2,3,4-tetrahydro-1-benzo[b]azocine; 1-(3-methylaminopropyl)-8-fluoro-1,2,3,4-tetrahydro-1-benzo[b]azocine; 1-(3-methylaminopropyl)-9-chloro-1,2,3,4-tetrahydro-1-benzo[b]azocine; 1-(3-ethylaminopropyl)-1,2,3,4-tetrahydro-1-benzo[b]azocine; 1-(3-ethylaminopropyl)-8-chloro-1,2,3,4-tetrahydro-1-benzo[b]azocine; 1-(3-ethylaminopropyl)-9-chloro-1,2,3,4-tetrahydro-1-benzo[b]azocine; 1-(3-dimethylaminopropyl)-1,2,3,4-tetrahydro-1-benzo[b]azocine; 1-(3-dimethylaminopropyl)-8-chloro-1,2,3,4-tetrahydro-1-benzo[b]azocine; 1-(3-dimethylaminopropyl)-8-fluoro-1,2,3,4-tetrahydro-1-benzo[b] azocine; 1-(3-dimethylaminopropyl)-9-chloro-1,2,3,4-tetrahydro-1-benzo[b]azocine; 1-(3-diethylaminopropyl)-1,2,3,4-tetrahydro-1-benzo[b]azocine; 1-(3-diethylaminopropyl)-8-chloro-1,2,3,4-tetrahydro-1-benzo[b]azocine; 1-(3-methylethylaminopropyl)-1,2,3,4-tetrahydro-1-benzo[b]azocine; 1-(3-N-methyl-N-ethylaminopropyl)-8-chloro-1,2,3,4-tetrahydro-1-benzo[b]azocine; 1-(3-piperidinopropyl)-1,2,3,4-tetrahydro-1-benzo[b]azocine; 1-(3-piperidinopropyl)-8-chloro-1,2,3,4-tetrahydro-1-benzo[b]azocine; 1-(3-piperidinopropyl)-9-chloro-1,2,3,4-tetrahydro-1-benzo[b]azocine; 1-(3-morpholinopropyl)-1,2,3,4-tetrahydro-1-benzo[b]azocine; 1-(3-morpholinopropyl)-8-chloro-1,2,3,4-tetrahydro-1-benzo[b]azocine; 1-(2-aminopropyl)-1,2,3,4-tetrahydro-1-benzo[b]azocine; 1-(2-aminopropyl)-8-chloro-1,2,3,4-tetrahydro-1-benzo[b]azocine; 1-(2-aminopropyl)-8-chloro-1,2,3,4-tetrahydro-1-benzo[b]azocine; 1-(2-aminopropyl)-8-fluoro1,2,3,4-tetrahydro-1-benzo[b]azocine; 1-(2-methylaminopropyl)-1,2,3,4-tetrahydro-1-benzo[b]azocine; 1-(2-methylaminopropyl)-8-chloro-1,2,3,4-tetrahydro-1-benzo[b]azocine; 1-(2-methylaminopropyl)-9-chloro-1,2,3,4-tetrahydro-1-benzo[b]azocine; 1-(2-ethylaminopropyl)-8-chloro-1,2,3,4-tetrahydro-1-benzo[b]azocine; 1-(2-ethylaminopropyl)-9-chloro-1,2,3,4-tetrahydro-1-benzo[b]azocine; 1-(2-propylaminopropyl)-8-chloro-1,2,3,4-tetrahydro-1-benzo[b]azocine; 1-(2-dimethylaminopropyl)-1,2,3,4-tetrahydro-1-benzo[b]azocine; 1-(2-dimethylaminopropyl)-8-chloro-1,2,3,4-tetrahydro-1-benzo[b]azocine; 1-(2-dimethylaminopropyl)-8-fluoro-1,2,3,4-tetrahydro-1-benzo[b]azocine; 1-(2-dimethylaminopropyl)-9-chloro-1,2,3,4-tetrahydro-1-benzo[b]azocine; 1-(2-diethylaminopropyl)-1,2,3,4-tetrahydro-1-benzo[b]azocine; 1-(2-diethylaminopropyl)-8-chloro-1,2,3,4-tetrahydro-1-benzo[b]azocine; 1-(2-diethylaminopropyl)-9-chloro-1,2,3,4-tetrahydro-1-benzo[b]azocine; 1-(2-N-methyl-N-ethylaminopropyl)-8-chloro-1,2,3,4-tetrahydro-1-benzo[b]azocine; 1-(2-piperidinopropyl)-1,2,3,4-tetrahydro-1-benzo[b]azocine; 1-(2-piperidinopropyl)-8-chloro-1,2,3,4-tetrahydro-1-benzo[b]azocine; 1-(2-piperidinopropyl)-8-fluoro-1,2,3,4-tetrahydro-1-benzo[b]azocine; 1-(2-piperidinopropyl)-9-chloro-1,2,3,4-tetrahydro-1-benzo[b]azocine; 1-(2-morpholinopropyl)-1,2,3,4-tetrahydro-1-benzo[b]azocine; 1-(2-morpholinopropyl)-8-chloro-1,2,3,4-tetrahydro-1-benzo[b]azocine; 1-(2-morpholinopropyl)-9-chloro-1,2,3,4-tetrahydro-1-benzo[b]azocine; 1-(4-aminobutyl)-1,2,3,4-tetrahydro-1-benzo[b]azocine; 1-(3-aminobutyl)-8-chloro-1,2,3,4-tetrahydro-1-benzo[b]azocine; 1-(3-dimethylaminobutyl)-8-chloro-1,2,3,4-tetrahydro-1-benzo[b]azocine; 1-(3-dimethylaminobutyl)-9-chloro-1,2,3,4-tetrahydro-1-benzo[b]azocine; 1-(4-dimethylaminobutyl)-8-chloro-1,2,3,4-tetrahydro-1-benzo[b]azocine; 1-(3-methylaminobutyl)-1,2,3,4-tetrahydro-1-benzo[b]azocine; 1-(3-piperidinobutyl)-8-chloro-1,2,3,4-tetrahydro-1-benzo[b]-azocine, etc.

The fifth stage is concerned with the hydrogenation of the 1-aminoalkyltetrahydrobenzo[b]azocine derivative [Ib]. Thus, the 1-aminoalkyltetrahydrobenzo[b]azocine derivative [Ib] is treated with hydrogen in the presence of a catalyst (e.g. Raney nickel, platinum oxide, palladium carbon) to give the 1-aminoalkylhexahydrobenzo[b]azocine derivatives [Ic]. The catalytic hydrogenation is favorably carried out in an inert solvent (e.g. methanol, ethanol, tetrahydrofuran, dioxane) at 20° to 200°C under 1 to 250 atm.

Examples of the above prepared 1-aminoalkylhexahydrobenzo[b]azocine derivative [Ic] are as follows: 1-(2-aminoethyl)-1,2,3,4,5,6-hexahydro-1-benzo[b]azocine; 1-(2-aminoethyl)-8-chloro-1,2,3,4,5,6-hexahydro-1-benzo[b]azocine; 1-(2-aminoethyl)-8-fluoro-1,2,3,4,5,6-hexahydro-1-benzo[b]azocine; 1-(2-aminoethyl)-9-chloro-1,2,3,4,5,6-hexahydro-1-benzo[b]azocine; 1-(2-methylaminoethyl)-1,2,3,4,5,6-hexahydro-1-benzo[b]azocine; 1-(2-methylaminoethyl)-8-chloro-1,2,3,4,5,6-hexahydro-1-benzo[b]azocine; 1-(2-methylaminoethyl)-9-chloro-1,2,3,4,5,6-hexahydro-1-benzo[b]azocine; 1-(2-ethylaminoethyl)-1,2,3,4,5,6-hexahydro-1-benzo[b]azocine; 1-(2-methylaminoethyl)-8-fluoro-1,2,3,4,5,6-hexahydro-1-benzo[b]azocine; 1-(2-ethylaminoethyl)-8-chloro-1,2,3,4,5,6-hexahydro-1-benzo[b]azocine; 1-(2-dimethylaminoethyl)-1,2,3,4,5,6-hexahydro-1-benzo[b]azocine; 1-(2-dimethylaminoethyl)-8-chloro-1,2,3,4,5,6-hexahydro-1-benzo[b]azocine; 1-(2-dimethylaminoethyl)-8-fluoro-1,2,3,4,5,6-hexahydro- 1-benzo[b]azocine; 1-(2-dimethylaminoethyl)-9-chloro-1,2,3,4,5,6-hexahydro-1-benzo[b]azocine; 1-(2-diethylaminoethyl)-1,2,3,4,5,6-hexahydro-1-benzo[b]azocine; 1-(2-propylaminoethyl)-8-chloro-1,2,3,4,5,6-hexahydro-1-benzo[b]azocine; 1-(2-diethylaminoethyl)-8-chloro-1,2,3,4,5,6-hexahydro-1-benzo[b]azocine; 1-(2-diethylaminoethyl)-9-chloro-1,2,3,4,5,6-hexahydro-1-benzo[b]azocine; 1-(2-N-methyl-N-ethylaminoethyl)-8-chloro-1,2,3,4,5,6-hexahydro-1-benzo[b]azocine; 1-(2-piperidinoethyl)-1,2,3,4,5,6-hexahydro-1-benzo[b]azocine; 1-(2-piperidinoethyl)-8-chloro-1,2,3,4,5,6-hexahydro-1-benzo[b]azocine; 1-(2-piperidinoethyl)-8-fluoro-1,2,3,4,5,6-hexahydro-1-benzo[b]azocine; 1-(2-piperidinoethyl)-9-chloro-1,2,3,4,5,6-hexahydro-1-benzo[b]azocine; 1-(2-morpholinoethyl)-1,2,3,4,5,6-hexahydro-1-benzo[b]azocine; 1-(2-morpholinoethyl)-8-chloro-1,2,3,4,5,6-hexahydro-1-benzo[b]azocine; 1-(2-morpholinoethyl)-8-fluoro-1,2,3,4,5,6-hexahydro-1-benzo[b]azocine; 1-(2-morpholinoethyl)-9-chloro-1,2,3,4,5,6-hexahydro-1-benzo[b]azocine; 1-(3-aminopropyl)-1,2,3,4,5,6-hexahydro-1-benzo[b]azocine; 1-(3-aminopropyl)-8-chloro-1,2,3,4,5,6-hexahydro-1-benzo[b]azocine; 1-(3-aminopropyl)-8-fluoro-1,2,3,4,5,6-hexahydro-1-benzo[b]azocine; 1-(3-aminopropyl)-9-chloro-1,2,3,4,5,6-hexahydro-1-benzo[b]azocine; 1-(3-methylaminopropyl)-1,2,3,4,5,6-hexahydro-1-benzo[b]azocine; 1-(3-methylaminopropyl)-8-chloro-1,2,3,4,5,6-hexahydro-1-benzo[b]azocine; 1-(3-methylaminopropyl)-8-fluoro-1,2,3,4,5,6-hexahydro-1-benzo[b]azocine; 1-(3-methylaminopropyl)-9-chloro-1,2,3,4,5,6-hexahydro-1-benzo[b]azocine; 1-(3-ethylaminopropyl)-1,2,3,4,5,6-hexahydro-1-benzo[b]azocine; 1-(3-ethylaminopropyl)-8-chloro-1,2,3,4,5,6-hexahydro-1-benzo[b]azocine; 1-(3-ethylaminopropyl)-9-chloro-1,2,3,4,5,6-hexahydro-1-benzo[b]azocine; 1-(3-dimethylaminopropyl)-1,2,3,4,5,6-hexahydro-1-benzo[b]azocine; 1-(3-dimethylaminopropyl)-8-chloro-1,2,3,4,5,6-hexahydro-1-benzo[b]azocine; 1-(3-dimethylaminopropyl)-8-fluoro-1,2,3,4,5,6-hexahydro-1-benzo[b]azocine; 1-(3dimethylaminopropyl 8-chloro-1,2,3,4,5,6-hexahydro-1-benzo[b]azocine; 1-(3-diethylaminopropyl)-1,2,3,4,5,6-hexahydro-1-benzo[b]azocine; 1-(3-dimethylaminopropyl-8-chloro-1,2,3,4,5,6-hexahydro-1-benzo[b]azocine; 1-(3-diethylaminopropyl)-9-chloro-1,2,3,4,5,6-hexahydro-1-benzo[b]azocine; 1-(3-N-methyl-N-ethylaminopropyl)-8-chloro-1,2,3,4,5,6-hexahydro-1-benzo[b]azocine; 1-(3-N-methyl-N-ethylaminopropyl)-1,2,3,4,5,6-hexahydro-1-benzo[b]azocine; 1-(3-piperidinopropyl)-1,2,3,4,5,6-hexahydro-1-benzo[b]azocine; 1-(3-piperidinopropyl)-8-chloro-1,2,3,4,5,6-hexahydro-1-benzo[b]azocine; 1-(3-piperidinopropyl)-9-chloro-1,2,3,4,5,6-hexahydro-1-benzo[b]azocine; 1-(3-morpholinopropyl)-1,2,3,4,5,6-hexahydro-1-benzo[b]azocine; 1-(3-morpholinopropyl)-8-chloro-1,2,3,4,5,6-hexahydro-1-benzo[b]azocine; 1-(3-morpholinopropyl)-9-chloro-1,2,3,4,5,6-hexahydro-1-benzo[b]azocine; 1-(2-aminopropyl)-1,2,3,4,5,6-hexahydro-1-benzo[b]azocine; 1-(2-aminopropyl)-8-chloro-1,2,3,4,5,6-hexahydro-1-benzo[b]azocine; 1-(2-aminopropyl)-8-fluoro-1,2,3,4,5,6-hexahydro-1-benzo[b]azocine; 1-(2-aminopropyl)-9-chloro-1,2,3,4,5,6-hexahydro-1-benzo[b]azocine; 1-(2-methylaminopropyl)-1,2,3,4,5,6-hexahydro-1-benzo[b]azocine; 1-(2-methylaminopropyl)-8-chloro-1,2,3,4,5,6-hexahydro-1-benzo[b]azocine; 1-(2-methylaminopropyl)-9-chloro-1,2,3,4,5,6-hexahydro-1-benzo[b]azocine; 1-(2-ethylaminopropyl)-8-chloro-1,2,3,4,5,6-hexahydro-1-benzo[b]azocine; 1-(2-ethylaminopropyl)-9-chloro-1,2,3,4,5,6-hexahydro-1-benzo[b]azocine; 1-(2-propylaminopropyl)-8-chloro-1,2,3,4,5,6-hexahydro-1-benzo[b]azocine; 1-(2-dimethylaminopropyl)-1,2,3,4,5,6-hexahydro-1-benzo[b]azocine; 1-(2-dimethylaminopropyl)-8-chloro-1,2,3,4,5,6-hexahydro-1-benzo[b]azocine; 1-(2-dimethylaminopropyl)-8-fluoro-1,2,3,4,5,6-hexahydro-1-benzo[b]azocine; 1-(2-dimethylaminopropyl)-9-chloro-1,2,3,4,5,6-hexahydro-1-benzo[b]azocine; 1-(2-diethylaminopropyl)-1,2,3,4,5,6-hexahydro-1-benzo[b]azocine; 1-(2-diethylaminopropyl)-8-chloro-1,2,3,4,5,6-hexahydro-1-benzo[b]azocine; 1-(2-diethylaminopropyl)-9-chloro-1,2,3,4,5,6-hexahydro-1-benzo[b]azocine; 1-(2-N-methyl-N-ethylaminopropyl)-8-chloro-1,2,3,4,5,6-hexahydro-1-benzo[b]azocine; 1-(2-piperidinopropyl)-1,2,3,4,5,6-hexahydro-1-benzo[b]azocine; 1-(2-piperidinopropyl)-8-chloro-1,2,3,4,5,6-hexahydro-1-benzo[b]-azocine; 1-(2-piperidinopropyl)-8-fluoro-1,2,3,4,5,6-hexahydro-1-benzo[b]azocine; 1-(2-piperidinopropyl)-9-chloro-1,2,3,4,5,6-hexahydro-1-benzo[b]azocine; 1-(2-morpholinopropyl)-1,2,3,4,5,6-hexahydro-1-benzo[b]azocine; 1-(2-morpholinopropyl)-8-chloro-1,2,3,4,5,6-hexahydro-1-benzo[b]azocine; 1-(2-morpholinopropyl)-9-chloro-1,2,3,4,5,6-hexahydro-1-benzo[b]azocine; 1-(4-aminobutyl)-1,2,3,4,5,6-hexahydro-1-benzo[b]azocine; 1-(3-aminobutyl)-8-chloro-1,2,3,4,5,6-hexahydro-1-benzo[b]azocine; 1-(3-dimethylaminobutyl)-8-chloro-1,2,3,4,5,6-hexahydro-1-benzo[b]azocine; 1-(3-dimethylaminobutyl)-9-chloro-1,2,3,4,5,6-hexahydro-1-benzo[b]azocine; 1-(4-dimethylaminobutyl)-8-chloro-1,2,3,4,5,6-hexahydro-1-benzo[b]azocine; 1-(3-methylaminobutyl)-1,2,3,4,5,6-hexahydro-1-benzo[b]azocine; 1-(3-piperidinobutyl)-8-chloro-1,2,3,4,5,6-hexahydro-1-benzo[b]azocine, etc.

The 1-substituted benzo[b]azocine derivatives [I], i.e., the 1-aminoalkanoyltetrahydrobenzo[b]azocine derivative [Ia], the 1-aminoalkyltetrahydrobenzo[b]azocine derivative [Ib] and the 1-aminoalkylhexahydrobenzo[b]azocine derivative [Ic], can be readily converted into their acid addition salts by treatment with inorganic acids (e.g. hydrochloric acid, hydrobromic acid, sulfuric acid, nitric acid, phosphoric acid) or organic acids (e.g. oxalic acid, maleic acid, tartaric acid, citric acid, acetic acid, succinic acid) in conventional manners.

Still, it may be understood that the 1-aminoalkanoyltetrahydrobenzo[b]azocine derivatives [Id] and [Ie] hereinabove illustrated as the intermediates are per se within the category of the objective 1-aminoalkanoyltetrahydrobenzo[b]azocine derivative [Ia].

Practical and presently preferred embodiments of the present invention are illustratively shown in the following Examples.

EXAMPLE 1

Reduction of the 1-unsubstituted benzo[b]azocine-2,6-dione derivative [II] to the 1-unsubstituted 6-hydroxybenzo[b]azocine derivative [III]:

[A] To a cooled mixture of 4.0 g of lithium aluminum hydride and 20 ml of tetrahydrofuran is added a solution of 3.0 g of 1,2,3,4,5,6-hexahydro-1-benzo[b]azocine-2,6-dione in 50 ml of tetrahydrofuran. The resultant mixture is stirred under gentle refluxing for 4 hours, and water added dropwise thereto under cooling with ice. The resulting precipitate is filtered off and the filtrate is evaporated to dryness. Recrystallization of the residue from benzene-n-hexane Recrystallization of the residue from benzene-n-hexane gives 6-hydroxy-1,2,3,4,5,6-hexahydro-1-benzo[b]azocine having a melting point of 93° to 94°C.

[B] In the same manner as in 8 A] but replacing 1,2,-3,4,5,6-hexahydro-1-benzo[b]azocine-2,6-dione by 8-chloro-1,2,3,4,5,6-hexahydro-1-benzo[b]azocine-2,6-dione, there is obtained 6-hydroxy-8-chloro-1,2,3,4,5,6-hexahydro-1-benzo[b]azocine having a melting point of 117° to 118°C.

EXAMPLE 2

Dehydration of the 1-unsubstituted 6-hydroxybenzo[b]azocine derivative [III] to the 1-unsubstituted tetrahydrobenzo[b]azocine derivative [IV]:

[A] To a solution of 5.0 g of 6-hydroxy-1,2,3,4,5,6-hexahydro-1-benzo[b]azocine in 500 ml of toluene is added 0.3 g of p-toluenesulfonic acid. The resultant mixture is refluxed for 30 hours, during which water is removed by azeotropic distillation. After cooling, the reaction mixture is washed with aqueous sodium carbonate solution and water, dried over anhydrous sodium sulfate and evaporated to give an oil residue. The residue is chromatographed on a column of silica gel (100 to 200 mesh) and eluted with benzene to give 3.7 g of 1,2,3,4-tetrahydro-1-benzo[b]azocine.

[B] In the same manner as in [A] but replacing 6-hydroxy-1,2,3,4,5,6-hexahydro-1-benzo[b]azocine by 6-hydroxy-8-chloro-1,2,3,4,5,6-hexahydro-1-benzo[b]azocine, there is obtained 8-chloro-1,2,3,4-tetrahydro-1-benzo[b]azocine having a melting point of 69° to 71°C.

EXAMPLE 3

Aminoalkanoylation of the 1-unsubstituted tetrahydrobenzo[b]azocine derivative [IV] to the 1-aminoalkanoyltetrahydrobenzo[b]azocine derivative [Ia]:

Aminoalkanoylation ([IV] → [Ia])

[A] To a stirred solution of 1.94 g of 8-chloro-1,2,3,4-tetrahydro-1-benzo[b]azocine and 1.2 g of pyridine in 30 ml of benzene are added dropwise 1.8 g of dimethylaminoacetyl chloride at 3° to 10°C for 6 minutes. The resulting mixture is stirred at room temperature for 5 hours. After stirring, the reaction mixture is washed with aqueous sodium carbonate solution and water, dried over anhydrous sodium sulfate and evaporated to give an oily residue. The residue is crystallized from benzene to give 1-dimethylaminoacetyl-8-chloro-1,2,3,4-tetrahydro-1-benzo[b]azocine having a melting point of 87° to 88°C.

[B] In the same manner as in [A] but replacing dimethylaminoacetyl chloride by β-formylaminopropionyl chloride, there is obtained an oily product of 1-(β-formylaminopropionyl)-8-chloro-1,2,3,4-tetrahydro-1-benzo[b]azocine having a boiling point of 196° to 198°C/0.1 mmHg.

[C] In the same manner as in [A] but replacing dimethylaminoacetyl chloride by β-methylaminopropionyl chloride, there is obtained 1-(β-methylaminopropionyl)8-chloro-1,2,3,4-tetrahydro-1-benzo[b]azocine, of which hydrochloride has a melting point of 129 to 131°C.

Haloalkanoylation ([IV] → [V])

[A] To a cooled solution of 2.5 g of 1,2,3,4,-tetrahydro-1-benzo[b]azocine in 150 ml of benzene are simultaneously added 3.3 g of bromoacetyl bromide and a solution of 0.65 g of sodium hydroxide in 6 ml of water at 8° to 12°C for 10 minutes. The resultant mixture is stirred at room temperature for 2 hours. The benzene layer is separated by decantation, washed with water, dried over anhydrous sodium sulfate and evaporated to give crude crystals. Recrystallization from ether gives 2.1 g of 1-bromoacetyl-1,2,3,4-tetrahydro-1-benzo[b]azocine having a melting point of 68° to 69°C.

[B] In the same manner as in [A] but replacing 1,2,3,4-tetrahydro-1-benzo[b]azocine by 8-chloro-1,2,3,4-tetrahydro-1-benzo[b]azocine, there is obtained 1-bromoacetyl-8-chloro-1,2,3,4-tetrahydro-1-benzo[b]azocine having a melting point of 119° to 120°C.

[C] To a stirred solution of 1.94 g of 8-chloro1,2,3,4-tetrahydro-1-benzo[b]azocine and 0.85 g of pyridine in 20 ml of benzene are added dropwise 2.1 g of bromoacetyl bromide at 5° to 7°C for 18 minutes. The resultant mixture is stirred at room temperature for 4 hours. The reaction mixture is washed with water, dried over anhydrous sodium sulfate and evaporated to give crude crystals. Recrystallization from benzene gives 1-bromoacetyl-8-chloro-1,2,3,4-tetrahydro-1-benzo[b]azocine having a melting point of 119° to 120°C.

[D] In the same manner as in [C] but replacing bromoacetyl bromide by β-bromopropionyl chloride, there is obtained 1-(β-bromopropionyl)-8-chloro-1,2,3,4-tetrahydro1-benzo [b]azocine having a melting point of 110° to 113°C.

Amination ([V] → [Ia])

[A] To a solution of 2.0 g of 1-bromoacetyl-1,2,3,4-tetrahydro-1-benzo[b]azocine in 50 ml of toluene are added 1.25 g of morpholine at room temperature. The resultant mixture is stirred under gentle refluxing for 2 hours. After allowing to stand at room temperature overnight, the reaction mixture is washed with water, dried over anhydrous sodium sulfate and evaporated to give an oily residue. The residue is crystallized from benzene to give 1-morpholinoacetyl-1,2,3,4-tetrahydro-1-benzo[b]azocine having a melting point of 114 to 115°C.

[B] To a solution of 1.5 g of 1-bromoacetyl-8-chloro-1,2,3,4-tetrahydro-1-benzo[b]azocine in 40 ml of toluene is added 0.83 g of morpholine at room temperature. The resultant mixture is stirred under gentle refluxing for 3 hours. After cooling, the reaction mixture is washed with water, dried over anhydrous sodium sulfate and evaporated to give an oily residue. The residue is dissolved in ether and hydrogen chloride is added to the solution to give crystals. Recrystallization from isopropanol gives 1-(morpholinoacetyl)-8-chloro-1,2,3,4-tetrahydro-1-benzo[b]azocine hydrochloride having a melting point of 221° to 222°C.

[C] In the same manner as in [A] but replacing 1-bromoacetyl-1,2,3,4-tetrahydro-1-benzo[b]azocine and morpholine by 1-bromoacetyl-8-chloro-1,2,3,4-tetrahydro-1-benzo[b]azocine and dimethylamine respectively, there is obtained 1-dimethylaminoacetyl-8-chloro-1,2,3,4-tetrahydro-1-benzo[b]azocine having a melting point of 87° to 89°C.

[D] In the same manner as in [A] but replacing 1-bromoacetyl-8-chloro-1,2,3,4-tetrahydro-1-benzo[b]azocine and morpholine by 1-($\beta$-bromopropionyl)-8-chloro-1,2,3,4-tetrahydro-1-benzo[b]azocine and dimethylamine repectively, there is obtained 1-($\beta$-dimethylaminopropionyl)-8-chloro-1,2,3,4-tetrahydro-1-benzo[b]azocine, of which hydrochloride has a melting point of 183° to 185°C.

[E] In the same manner as in [A] but replacing 1-bromoacetyl-1,2,3,4,-tetrahydro-1-benzo[b]azocine and morpholine by 1-bromoacetyl-8-chloro-1,2,3,4-tetrahydro-1-benzo[b]azocine and piperidine, there is obtained 1-piperidinoacetyl-8-chloro-1,2,3,4-tetrahydro-1-benzo[b]azocine.

[F] In the same manner as in [A] but replacing morpholine by propylamine, there is obtained 1-propylaminoacetyl-8-chloro-1,2,3,4-tetrahydro-1-benzo[b]azocine, of which hydrochloride has a melting point of 117 to 119°C.

Amination ([V] → (I$d9$))

[A] To a solution of 6.5 g of 1-($\beta$-bromopropionyl)-8-chloro-1,2,3,4-tetrahydro-1-benzo[b]azocine in 50 ml of benzene is added a solution of 12 g of methylamine in 250 ml of benzene at room temperature. The resultant mixture is stirred under gentle refluxing for 7 hours. After cooling, the reaction mixture is washed with water and extracted with hydrochloric acid. The aqueous layer is made alkaline with aqueous sodium carbonate solution and extracted with ether. The extract is dried over sodium sulfate and evaporated to give an oily residue. The residue is dissolved in ether and hydrogen chloride is added to the solution to give crystals. Recrystallization from isopropanol-ether gives 1-($\beta$-methylaminopropionyl)-8-chloro-1,2,3,4-tetrahydro-1-benzo[b]azocine hydrochloride having a melting point of 126° to 128°C.

[B] In the same manner as in [A] but replacing 1-($\beta$-bromopropionyl)-8-chloro-1,2,3,4-tetrahydro-1-benzo[b]azocine by 1-bromoacetyl-8-chloro-1,2,3,4-tetrahydro-1-benzo[b]azocine, there is obtained 1-methylaminoacetyl-8-chloro-1,2,3,4-tetrahydro-1-benzo[b]azocine hydrochloride having a melting point of 119° to 121°C.

Acylation ([I$d$] → [I$a$])

[A] A solution of 2 g of 1-($\beta$-aminopropionyl)-8-chloro-1,2,3,4-tetrahydro-1-benzo[b]azocine and 1 g of 85 % formic acid in 50 ml of toluene is refluxed for 3 hours, during which water is removed by azeotropic distillation. Then, the solvent is removed under reduced pressure to give 2.5 g of an oil. The oil is dissolved in 200 ml of benzene. The bezene layer is washed with N hydrochloric acid and water, dried over sodium sulfate and the solvent is removed. The residue is distilled under reduced pressure to give 1.5 g of 1-($\beta$-formylaminopropionyl)-$\beta$-chloro-1,2,3,4-tetrahydro-1-benzo[b]azocine as a viscous oil having a boiling point of 196° to 198°C/0.1 mmHg.

Phthalimidoalkanoylation ([IV] → [VI])

[A] To a solution of 9.0 g of 8-chloro-1,2,3,4-tetrahydro-1-benzo[b]azocine and 4.0 g of pyridine in 150 ml of benzene are added 12 g of $\beta$-phthalimidopropionyl chloride at 25°C. The resulting mixture is stirred at room temperature for additional 1 hour. The reaction mixture is washed with aqueous sodium carbonate and water, dried over anhydrous sodium sulfate and evaporated to give crude crystals. Recrystallization from ethanol gives 18.5 g of 1-($\beta$-phthalimidopropionyl)8-chloro-1,2,3,4-tetrahydro-1-benzo[b]azocine having a melting point of 145° to 147°C.

[B] In the same manner as in [A] but replacing $\beta$-phthalimidopropionyl chloride by phthalimidoacetyl chloride, there is obtained 1-phthalimidoacetyl-8-chloro-1,2,3,4-tetrahydro-1-benzo[b]azocine having a melting point of 184° to 185°C.

[C] In the same manner as in [A] but replacing $\beta$-phthalimidopropionyl chloride by $\alpha$-phthalimidopropionyl chloride, there is obtained 1-($\alpha$-phthalimidopropionyl)-8-chloro-1,2,3,4-tetrahydro-1-benzo[b]azocine having a melting point of 170° to 171°C.

Dephthaloylation ([VI] → [I$e$])

[A] To a solution of 18.5 g of 1-($\beta$-phthalimidopropionyl)-8-chloro-1,2,3,4-tetrahydro-1-benzo[b]azocine in 100 ml of chloroform and 70 ml of ethanol are added 6.6 g of 80 % hydrazine hydrate. The resulting mixture is stirred at room temperature for 16 hours. The solvent is removed under reduced pressure to dryness. Dilute ammonia water is added to the residue, and the mixture is extracted with ether. The ether layer is washed with water and extracted with 10 % hydrochloric acid. The aqueous layer is neutralized with ammonia water and extracted with ether. The ether layer is dried over anhydrous sodium sulfate and ether is removed to give 1-($\beta$-aminopropionyl)-8-chloro-1,2,3,4-tetrahydro-1-benzo[b]azocine as an oil. The oil is dissolved in benzene and a small amount of acetic acid is added thereto. The mixture is allowed to stand at room temperature overnight to give 1-($\beta$-aminopropionyl)8-chloro-1,2,3,4-tetrahydro-1-benzo[b]azocine acetate having a melting point of 168 to 169°C.

[B] In the same manner as in [A] but replacing 1-($\beta$-phthalimidopropionyl)-8-chloro-1,2,3,4-tetrahydro-1-benzo[b]azocine by 1-phthalimidoacetyl-8-chloro-1,2,3,4-tetrahydro-1-benzo[b]azocine, there is obtained 1-aminoacetyl-8-chloro-1,2,3,4-tetrahydro-1-benze[b]azocine as an oil. The oil is dissolved in ether and hydrogen chloride is bubbled into the solution to give 1-aminoacetyl-8-chloro-1,2,3,4-tetrahydro-1-benzo[b]azocine hydrochloride having a melting point of 216° to 217°C.

[C] In the same manner as in [A] but replacing 1-($\beta$-phthalimidopropionyl)-8-chloro-1,2,3,4-tetrahydro-1-benzo[b]azocine by 1-($\alpha$-phthalimidopropionyl)-8-chloro-1,2,3,4-tetrahydro-1-benzo[b]azocine, there is obtained 1-($\alpha$-aminopropionyl)-8-chloro-1,2,3,4-tetrahydro-1-benzo[b]azocine, of which hydrochloride has a melting point of 158 to 160°C.

EXAMPLE 4

Reduction of the 1-aminoalkanoyltetrahydrobenzo[b] azocine derivative [I$a$] to the 1-aminoalkyltetrahydrobenzo[b]azocine derivative [I$b$]:

[A] To a mixture of 1 g of lithium aluminum hydride and 50 ml of ether is added a solution of 2.8 g of 1-($\beta$-dimethylaminopropionyl)-8-chloro-1,2,3,4-tetrahydro-1-benzo[b]azocine in 100 ml of ether. The resultant

[E] In the same manner as in [C] but replacing 1-(β-formylaminopropionyl)-β-chloro-1,2,3,4-tetrahydro-1-benzo[b]azocine by 1-aminoacetyl-8-chloro-1,2,3,4-tetrahydro-1-benzo[b]azocine, there is obtained 1-(2-aminoethyl)-8-chloro1,2,3,4-tetrahydro-1-benzo[b]azocine dihydrochloride having a melting point of 187° to 189°C.

[F] In the same manner as in [C] but replacing 1-(β-formylaminopropionyl)-8-chloro-1,2,3,4-tetrahydro-1-benzo[b]azocine by 1-(α-aminopropionyl)-8-chloro-1,2,3,4-tetrahydro-1-benzo[b]azocine, there is obtained 1-(2-aminopropyl)-8-chloro-1,2,3,4-tetrahydro-1-benzo[b]azocine dihydrochloride having a melting point of 203° to 205°C.

[G] In the same manner as in [C] but replacing 1-(β-formylaminopropionyl)-8-chloro-1,2,3,4-tetrahydro-1-benzo[b]azocine by 1-methylaminoacetyl-8-chloro-1,2,3,4-tetrahydro-1-benzo[b]azocine, there is obtained 1-(2-methylaminoethyl)-8-chloro-1,2,3,4-tetrahydro-1-benzo[b]azocine dihydrochloride having a melting point of 179° to 181°C.

EXAMPLE 5

Hydrogenation of the 1-aminoalkyltetrahydrobenzo[b]-azocine derivative [Ib] to the 1-aminoalkylhexahydrobenzo[b]azocine derivative [Ic]:

[A] A mixture of 3.5g of 1-(2-aminopropyl)-1,2,3,4-tetrahydro-1-benzo[b]azocine and 2 g of Raney nickel in 100 ml of ethanol is stirred at 40°C under hydrogen atmosphere for 3 hours. The catalyst is filtered off and the filtrate is concentrated. The residue is dissolved in 60 ml of ether, and hydrogen chloride is bubbled into the solution to give crystals. Recrystallization from isopropanol gives 2.9 g of 1-(2-aminopropyl)-1,2,3,4,5,6-hexahydro-1-benzo[b]azocine hydrochloride having a melting point of 170° to 172°C.

What is claimed is:

1. A 1-substituted benzo[b]azocine derivative of the formula:

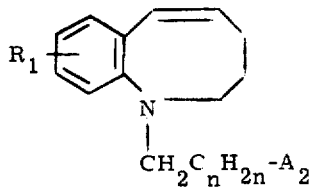

wherein $R_1$ is a hydrogen atom or halogen atom, $A_2$ is a piperidino group, a morpholino group or a group of the formula:

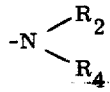

wherein $R_2$ is a hydrogen atom or a lower alkyl group and $R_4$ is a hydrogen atom or a lower alkyl group and $n$ is an integer from 1 to 3, and pharmaceutically acceptable additional salts thereof.

2. The compound according to claim 1 wherein said lower alkyl group is selected from methyl, ethyl, propyl, isopropyl and butyl.

3. The compound according to claim 1, wherein $R_1$ is a hydrogen atom.

4. The compound according to claim 1, wherein $R_1$ is a halogen atom.

5. The compound according to claim 4, wherein said halogen atom is chlorine or fluorine.

6. The compound according to claim 1, wherein $A_2$ is a piperidino group.

mixture is stirred under reflux for 3 hours. Water is added to the reaction mixture to decompose the aluminum complex. The ether layer is separated by decantation and the solvent is removed to give 2.1 g of 1-(3-dimethylaminopropyl)-8-chloro-1,2,3,4-tetrahydro-1-benzo[b]azocine as an oil. To 1.2 g of the oil is added a solution of 0.9 g of citric acid monohydrate in 10 ml of isopropanol, and the mixture is allowed to stand at room temperature to give crystals. Recrystallization from isopropanol gives 1-(3-dimethylaminopropyl)-8-chloro-1,2,3,4-tetrahydro-1-benzo[b]azocine monocitrate having a melting point of 113° to 115°C.

[B] In the same manner as in 08 A] but replacing 1-(β-dimethylaminopropionyl)-8-chloro-1,2,3,4-tetrahydro-1-benzo[b]azocine by 1-dimethylaminoacetyl-8-chloro-1,2,3,4-tetrahydro-1-benzo[b]azocine, there is obtained 1-(2-dimethylaminoethyl)-8-chloro-1,2,3,4-tetrahydro-1-benzo[b]azocine monocitrate having a melting point of 121° to 123°C.

[C] To a mixture of 2.5 g of lithium aluminum hydride and 40 ml of ether is added a solution of 2.3 g of 1-(β-formylaminopropionyl)-8-chloro-1,2,3,4-tetrahydro-1-benzo[b]azocine in 60 ml of ether. The resulting mixture is stirred at 25° to 30°C for 4 hours. Water is added to the reaction mixture to decompose the aluminum complex. The ether layer is separated by decantation and hydrogen chloride is added to the solution to give crystals. Recrystallization from isopropanol-ether gives 1.4 g of 1-(3-methylaminopropyl)-8-chloro-1,2,3,4-tetrahydro-1-benzo[b]azocine monohyrochloride having a melting point of 129° to 131°C.

[D] In the same manner as in [C] but replacing 1-(β-formylaminopropionyl)-β-chloro-1,2,3,4-tetrahydro-1-benzo[b]azocine by 1-(β-methylaminopropionyl)-8-chloro-1,2,3,4-tetrahydro-1-benzo[b]azocine, there is obtained 1-(3-methylaminopropyl)-8-chloro-1,2,3,4-tetrahydro-1-benzo [b]azocine monohydrochloride having a melting point of 129° to 131°C.

7. The compound according to claim 1, wherein $A_2$ is a morpholino group.

8. The compound according to claim 1, wherein $A_2$ is a group of the formula

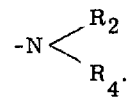

9. The compound according to claim 8, wherein $R_2$ is a lower alkyl.

10. The compound according to claim 9, wherein $R_4$ is a lower alkyl.

11. The compound according to claim 8 wherein $R_4$ is a lower alkyl.

12. The compound according to claim 1, which is a pharmaceutically acceptable addition salt thereof wherein said addition salt is selected from the group consisting of hydrohalides, sulfate, nitrate and phosphate.

13. The compound according to claim 12, wherein said hydrohalides are selected from the group consisting of hydrochloride and hydrobromide.

14. The compound according to claim 1, which is a pharmaceutically acceptable salt selected from the group consisting of oxalate, maleate, tartrate, citrate, acetate and succinate.

15. The compound according to claim 1, which is 1-(3-Methylaminopropyl)-8-chloro-1,2,3,4-tetrahydro-1-benzo[b]azocine or a pharmaceutically acceptable addition salt thereof.

16. The compound according to claim 1, which is 1-(3-Dimethylaminopropyl)-8-chloro-1,2,3,4-tetrahydro-1-benzo[b]azocine or a pharmaceutically acceptable addition salt thereof.

17. The compound according to claim 1, which is 1-(2-Methylaminoethyl)-8-chloro-1,2,3,4-tetrahydro-1-benzo[b]azocine or a pharmaceutically acceptable addition salt thereof.

18. The compound according to claim 1, which is 1-(2-Dimethylaminoethyl)-8-chloro-1,2,3,4-tetrahydro-1-benzo[b]azocine or a pharmaceutically acceptable addition salt thereof.

* * * * *